(12) United States Patent
Wigsten (10) Patent No.: US 8,105,195 B2
(45) Date of Patent: Jan. 31, 2012

(54) ROTATIONAL ONE WAY CLUTCH CHAIN TENSIONER WITH FRICTIONAL DAMPING

(75) Inventor: Mark M. Wigsten, Lansing, NY (US)

(73) Assignee: BorgWarner Inc., Auburn Hills, MI (US)

( * ) Notice: Subject to any disclaimer, the term of this patent is extended or adjusted under 35 U.S.C. 154(b) by 489 days.

(21) Appl. No.: 12/438,777

(22) PCT Filed: Aug. 30, 2007

(86) PCT No.: PCT/US2007/077206
§ 371 (c)(1),
(2), (4) Date: Feb. 25, 2009

(87) PCT Pub. No.: WO2008/028023
PCT Pub. Date: Mar. 6, 2008

(65) Prior Publication Data
US 2009/0325749 A1    Dec. 31, 2009

Related U.S. Application Data

(60) Provisional application No. 60/824,314, filed on Sep. 1, 2006.

(51) Int. Cl.
*F16H 7/08*    (2006.01)
(52) U.S. Cl. .......................................... 474/111; 474/109
(58) Field of Classification Search .................. 474/101, 474/109, 110, 111, 140, 117, 135
See application file for complete search history.

(56) References Cited

U.S. PATENT DOCUMENTS

| | | | |
|---|---|---|---|
| 1,777,527 A | 10/1930 | Morse | |
| 3,811,332 A | 5/1974 | Brown et al. | |
| 4,553,509 A | 11/1985 | Mezger et al. | |
| 6,129,644 A | 10/2000 | Inoue | |
| 6,322,470 B1 * | 11/2001 | Markley et al. | 474/111 |
| 6,599,208 B2 | 7/2003 | Bianchi et al. | |

(Continued)

FOREIGN PATENT DOCUMENTS
DE    19847416 A1    5/1999
(Continued)

OTHER PUBLICATIONS

PCT Search Report; PCT/US2007/077206; Feb. 12, 1008, 10 pages.
Extended Search Report for EP Patent Application No. 07841601.3, mailed Mar. 10, 2010, 4 pages.

*Primary Examiner* — William E Dondero
(74) *Attorney, Agent, or Firm* — Brown & Michaels, PC (57) ABSTRACT

A tensioner for a power transmission system includes two tensioning arms operatively engaged with a strand of either the chain or the belt of the power transmission system. The upper end of each tensioning arm is connected to a one way rotational clutch which is pivotally mounted between the upper ends of the tensioning arms. The one way clutch rotates in one direction in response to changing chain loads to adjust the tension substantially equally on both strands at the same time. In order to prevent over-tensioning, a damping means is included in the one-way clutch. When a pre-determined overload threshold is reached, the amount of torque required to overcome the coefficient of friction of a spring in the damper allows the one way clutch to slip in the direction opposite from its normal rotational direction, thereby relieving the overload condition on the chain.

13 Claims, 8 Drawing Sheets

U.S. PATENT DOCUMENTS

| | | |
|---|---|---|
| 6,955,621 B2 * | 10/2005 | Wigsten et al. .............. 474/110 |
| 6,960,145 B2 | 11/2005 | Fraley, Jr. et al. |
| 2002/0160868 A1 | 10/2002 | Wigsten et al. |
| 2004/0152548 A1 | 8/2004 | Markley et al. |
| 2006/0035740 A1 | 2/2006 | Lehtovaara et al. |
| 2009/0176609 A1 | 7/2009 | Lehtovaara et al. |

FOREIGN PATENT DOCUMENTS

| | | |
|---|---|---|
| JP | 2000274500 | 10/2000 |
| JP | 2002089636 A | 3/2002 |
| WO | 03048606 A | 6/2003 |

* cited by examiner

Prior Art

ROTATIONAL ONE WAY CLUTCH CHAIN TENSIONER WITH FRICTIONAL DAMPING

FIELD OF THE INVENTION

This invention pertains to the field of tensioners for a closed loop power transmission system of an internal combustion engine. The power transmission mechanism may consist of either a chain or a belt, but for purposes of describing this invention, reference is made to a chain. More particularly, the invention consists of a dual arm tensioner for simultaneously tensioning both strands of the chain between the drive and at least one driven sprocket combined with a frictionally damped one way clutch connected to both arms of the tensioner.

BACKGROUND OF THE INVENTION

A tensioning device is used to control a closed loop power transmission system, such as a chain, as the chain travels between a plurality of sprockets which are connected to the operating shafts of an internal combustion engine. In this system, the chain transmits power from a driving shaft to at least one driven shaft, such as a camshaft, so that, at any point in time, part of the chain might be slack while part is tight. It is important to impart and maintain a certain degree of tension on the chain to prevent noise, slippage, or the unmeshing of teeth as in the case of a toothed chain drive system. Prevention of such slippage is particularly important in the case of a chain driven camshaft of an internal combustion engine because the jumping of teeth from the camshaft sprockets will throw off engine cam timing, possibly causing damage to the engine or rendering it totally inoperative.

In the harsh environment of the internal combustion engine, numerous factors cause fluctuations in tension along any given portion of the chain at any time in its rotational cycle. For instance, extreme temperature fluctuations and differences in the coefficients of thermal expansion between various components of the engine can cause tension on the chain to rapidly alternate between high and low levels. Further, after prolonged use, wear to the components of the power transmission system results in a progressive decrease in chain tension. In addition, camshaft and crankshaft induced torsional vibrations cause considerable variations in chain tension. For example, the reverse rotation of an engine, such as that which occurs during stopping of the engine or in failed attempts at starting the engine, can also cause significant fluctuations in chain tension. For these reasons, a mechanism is desired to remove excessive tensioning forces on the tight side of the chain while, at the same time, ensuring that adequate tension is applied to the slack side of the chain.

Hydraulic tensioners are a known device for maintaining proper chain tension. In general, these mechanisms employ a lever arm that pushes against the chain on the slack side of the power transmission system. Hydraulic pressure urges a piston against the lever arm, which in turn, forcibly engages the chain to tighten it during slack conditions.

Blade spring tensioners are also commonly used to control a chain or belt where load fluctuations are not so severe as to overly stress the springs. A conventional blade spring tensioner includes a blade shoe having a curved chain sliding surface which maintains contact with the strand of chain with which it is engaged. To increase the amount of tensioning force applied to the chain, at least one blade spring is installed between the blade shoe and the chain sliding surface. A bracket houses the blade shoe and the chain sliding surface. The bracket is securely mounted to the engine by bolts, rivets or other such means. There may be only one mounting means which would allow the bracket to pivot in response to changing tension loads. The pivot point may be at either end of the bracket or in the middle, as required. Alternatively, the bracket may be securely mounted to the engine by two or more mounting means which effectively prevents any pivoting movement of the tensioner. In any case, the mounting means are located adjacent the strand of chain with which the tensioner is engaged. Often, the mounting means are located outside of chain loop itself.

Figure 1:
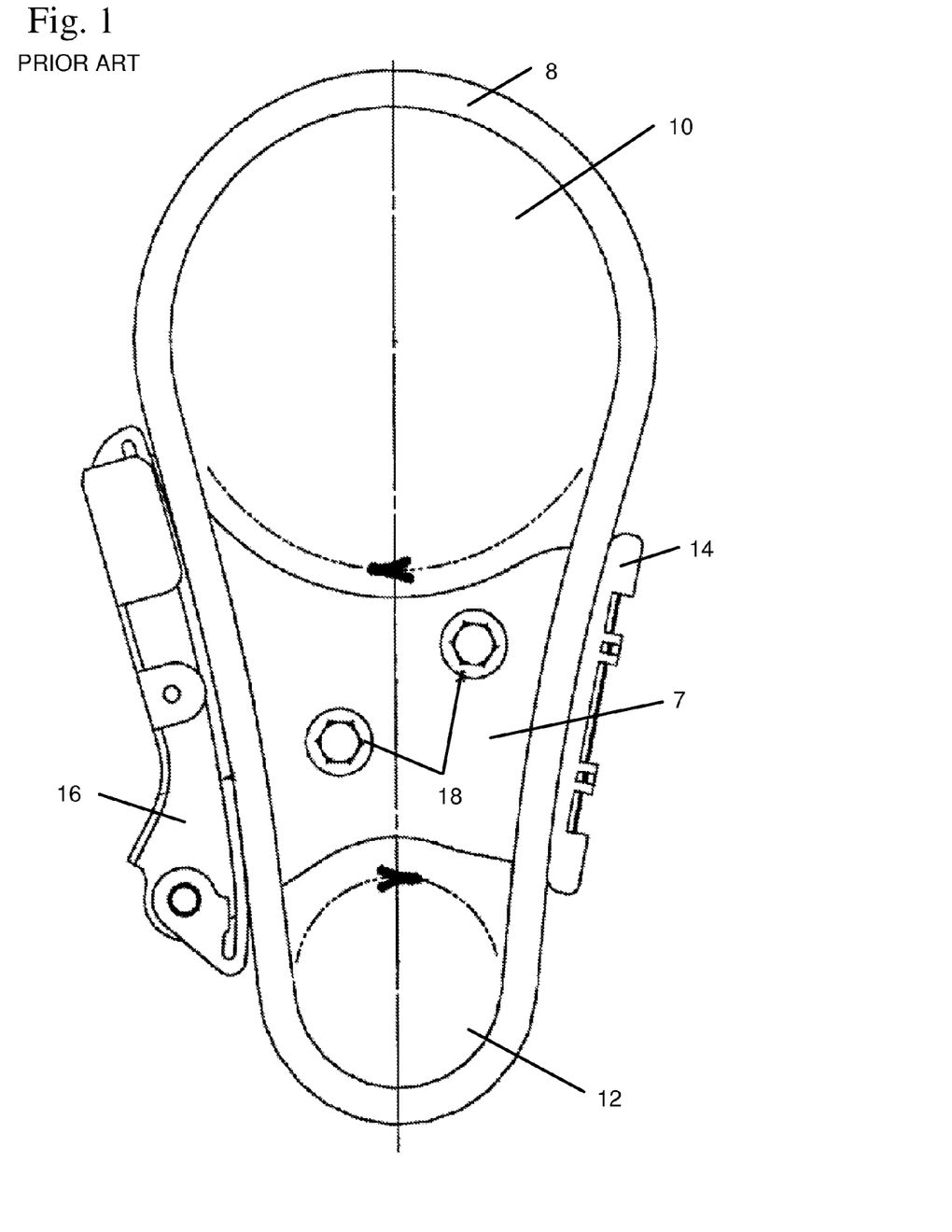
FIG. 1 shows a prior art tensioner on one strand of chain and a chain guide on the other strand of chain installed on a closed loop power transmission system.

FIG. 1 shows a prior art chain drive system having a blade tensioner and a guide. A closed loop chain 8 encircles driving sprocket 12 and driven sprocket 10. Each sprocket 10 and 12 accelerates and decelerates independently while maintaining forward motion. A fixed guide 14 is attached to a bracket 7 on the tight strand of the chain. Opposite the guide 14 on the slack strand of the chain is a tensioner 16, which is at least semi-rigidly fixed to the bracket 7 and is biased towards the tight strand of chain. Bolts 18 fasten the bracket containing the tensioner 16 and the guide 14 to the engine block (not shown).

When the driving sprocket 12 accelerates or the driven sprocket 10 decelerates, an energy wave or high local load is created in the tight strand of the chain, which travels from the sprocket that has changed in velocity toward the other sprocket. The chain 8 attempts to span the distance between the portion of the chain in contact with the initiating sprocket to the other sprocket in the shortest possible distance, that being a straight line. The energy moves through the links on the free strand of the chain until it comes to the end of the guide 14, which absorbs the energy. As a result of the constant absorption of the high local load, the ends of guide 14 sustain significant wear. The energy wave can also be present and provide the same result as if it were to have originated in the slack strand. However, the effects of these energy waves may not occur at all depending on how well the tensioner keeps the slack out of the chain.

U.S. Pat. No. 6,322,470 discloses a tensioner that includes a pair of pivoting arms used to simultaneously tension two separate strands of the same chain. A lever with fixed pins is located between the two strands. The arms are pivotally mounted to the fixed pins and extend outside the strands of the chain. They contain shoes that contact the outside portion of the chain. Rotation of the lever causes the fixed pins to move laterally and draw in the arms to simultaneously impart tension to the separate strands of chain.

Figure 2:
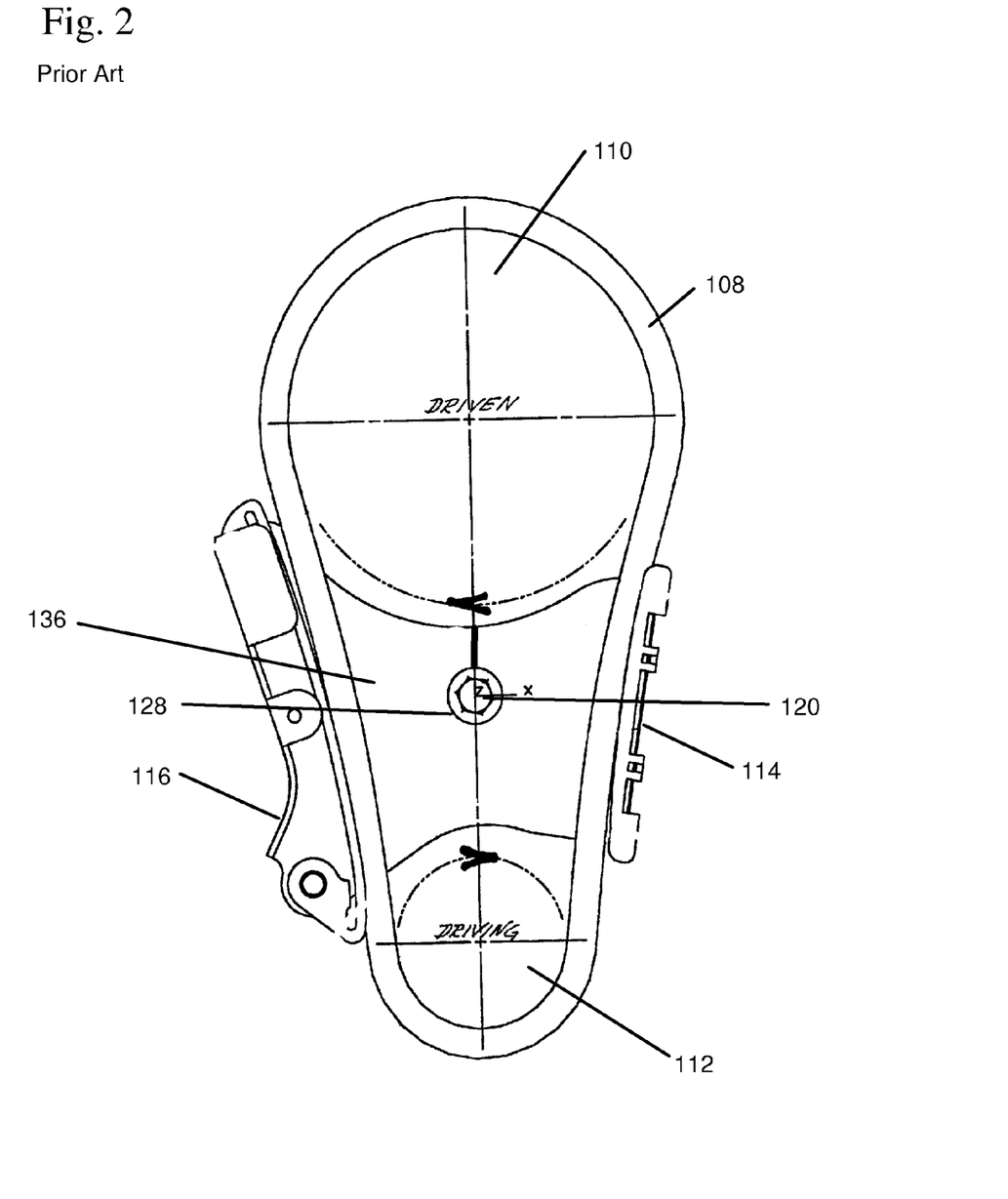
FIG. 2 shows a prior art tensioner similar to the tensioner of FIG. 1 with the exception that the bracket is allowed to pivot about a pivot point located on the center line between the central axis of the drive sprocket and the central axis of the driven sprocket.

Referring to FIG. 2, a chain tensioner assembly as disclosed in U.S. Patent Publication No. 2005/0085322A1 is shown. The chain tensioner assembly consists of a tensioner 116 and a chain guide 114, both of which are secured to a bracket 136. The tensioner 116 engages one strand of chain 108 while the chain guide 114 engages the other strand of the chain. The bracket is pivotally mounted to the engine housing at a pivot point 120 which is located in hole 128 between the two strands of the chain and along the centerline that is formed between the central axis of the driving sprocket 112 and the central axis of the driven sprocket 110. The bracket is allowed to pivot about the pivot point 120 in either a clockwise or counterclockwise direction in response to either slack or tight tension conditions.

U.S. Pat. No. 6,592,482 discloses a tensioner for the accessory drive system on the outside of the engine. It consists of a pulley located on one end of a pivot arm that is biased toward the drive belt by a torsion spring. The tensioner also contains a one-way clutch coupled with a friction clutch. The pivot arm is biased to move in the direction of the belt, but is prevented from freely retracting until a predetermined torque is reached on the friction clutch. The pulley is only allowed to move away from the belt when the tension on the belt exceeds the combination of the force of the torsion spring and the predetermined torque of the friction clutch.

Similar to the '482 patent, U.S. Patent publication 2005/0059518 A1 discloses an asymmetrical belt tensioner that provides damping when either increased or reduced belt tension occurs. The ability to adjust to either condition is made possible by using a one-way clutch which enables movement in only one direction toward the belt. However, when a certain high level of belt tension occurs, the force of a frictional damper is overcome, thus allowing movement away from the belt.

A typical closed loop chain drive power transmission system will have one strand that is tight most of the time during operation while the other strand is correspondingly slack. The prior art tensioners noted above have addressed this situation by placing a tensioning device in contact with the strand that is predominantly slack while merely placing a guide element adjacent the tight strand. These devices are not capable of providing a smooth transition from the predominant tension condition to the opposite tension condition in which the tight strand becomes slack and the slack strand becomes tight. It is desirable to have a tensioner that can smoothly adjust to a reversal in the predominant tension condition of the chain so that a balanced tension is experienced by both strands consistently throughout the entire chain system.

SUMMARY OF THE INVENTION

The present invention is a tensioner for a chain driven power transmission system that includes a tensioning arm operatively engaged with each of two strands of the chain which traverses between the sprocket of the driveshaft and the sprocket of at least one camshaft. The lower end of each tensioning arm is pivotally mounted to the engine at a single mounting point. The upper end of each tensioning arm is connected by a linkage to a one way rotational clutch which is pivotally mounted to the engine at a location between the upper ends of the tensioning arms. The one way clutch rotates in one direction in response to constantly changing chain loads. The linkages transmit substantially equal tension to both strands of chain at the same time.

Thermal expansion within the various components of the chain drive system, dynamic stretching of the chain or extreme resonances throughout the system may cause the tensioner to over-tension the chain. In order to prevent this, the present invention includes a damping means within the one-way clutch. The damping means consists of a spring that applies a frictional load to the one-way clutch. When a predetermined stress overload limit is detected, the amount of torque required to overcome the coefficient of friction is reached, which then allows the one way clutch to slip in the direction opposite from its normal rotational direction, thus preventing over-tensioning of the chain.

DETAILED DESCRIPTION OF THE INVENTION

Figure 3:
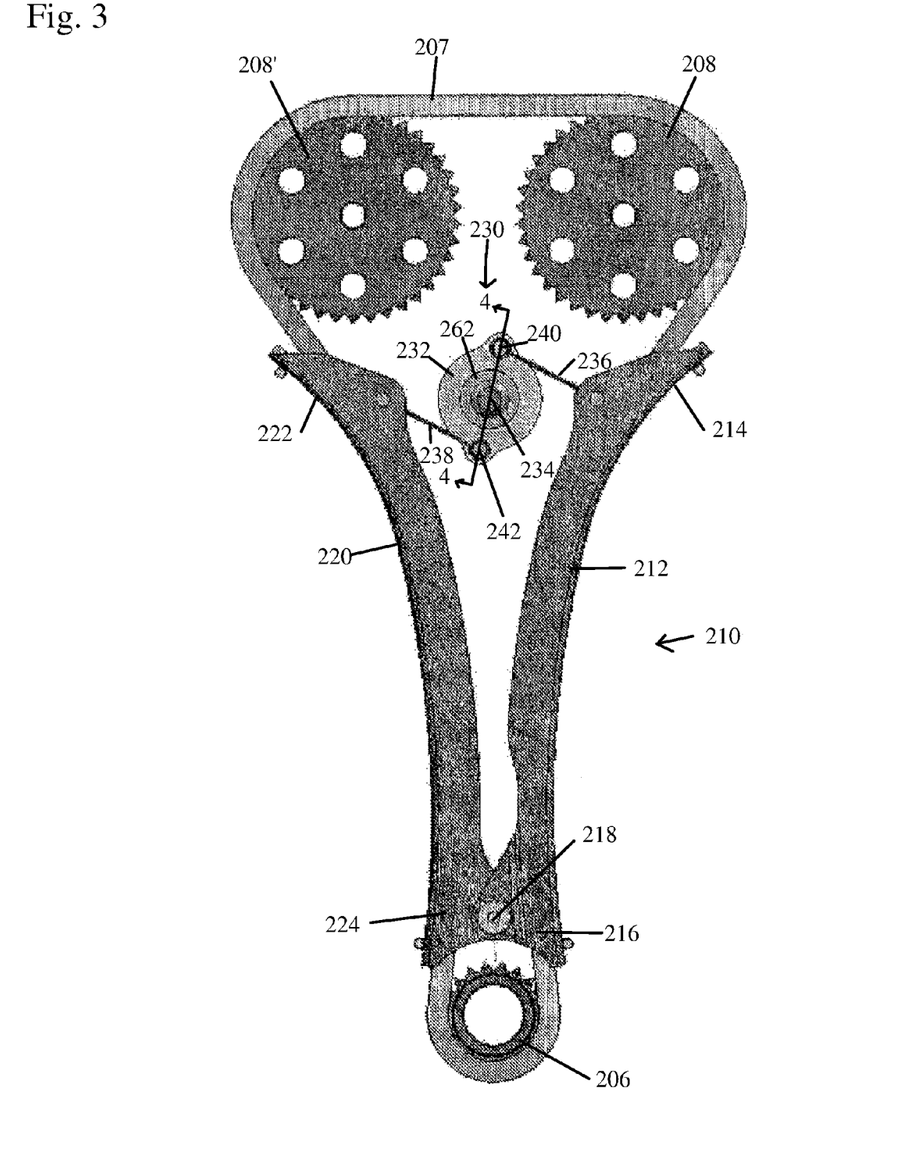
FIG. 3 shows a front elevation view of the one way friction damped tensioner of the present invention installed on dual cam power transmission system of an internal combustion engine.

FIG. 3 shows the tensioner 210 of the present invention operatively engaged with a power transmission system of an internal combustion engine. The power transmission system shown includes a drive sprocket 206 that drives cam sprockets 208 and 208' via chain 207. The tensioner 210 consists of a first tensioning arm 212 having a chain sliding surface (not shown) for engagement with a first strand of chain 207 and a second tensioning arm 220 having a chain sliding surface (not shown) for engagement with a second strand of 207. The first tensioning arm 212 has a first end 214 and a second end 216. The second tensioning arm 220 has a first end 222 and a second end 224. The second ends of each tensioning arm are pivotally secured to the engine (not shown) by a single pivot mount 218, as illustrated in FIG. 3. Alternatively, each tensioning arm may be separately pivotally mounted to the engine housing. Further, each tensioning arm may optionally include at least one elongated blade spring on its chain sliding surface.

Located between the first ends of each tensioning arm is a one way clutch 230. The one way clutch can be any of the following: a rotational mechanical clutch, a rotational hydraulic clutch, a linear mechanical clutch, a linear hydraulic clutch or a spring/ratchet design. Such clutches are known in the art. The most preferred clutch for the present invention is a rotational mechanical clutch, shown in FIG. 3. The one way clutch 230 is pivotally mounted to the engine by pivotal mounting means 234. Pivotal mounting means 234 may be any conventional device, such as a bolt or a pin that is press fit into the front housing of the engine. The one way clutch 230 contains a disc shaped base plate 232 that rotates with respect to the pivotal mounting means 234. A first linkage 236 connects the first end 214 of the first tensioning arm 212 with the disc shaped base plate 232. The first linkage 236 is pivotally secured to the base plate 232 at a location in proximity to the outer edge of the base plate 232 by a first linkage attachment means 240. A second linkage 238 connects the first end 222 of the second tensioning arm 220 to the disc shaped base plate 232. The second linkage 238 is pivotally secured to the base plate 232 by a second linkage attachment means 242 in proximity to the outer edge of the base plate 232 at a location that is different than the location of the first linkage attachment means 240. The first and second linkage attachment means may be positioned approximately 180 degrees from each other, but this is dependent on functional and design parameters of the tensioner 210. Each of the linkage attachment means 240 and 242 may consist of a conventional bolt and nut, a press fit pin or a rivet, as necessitated by design requirements or space limitations.

Figure 4:
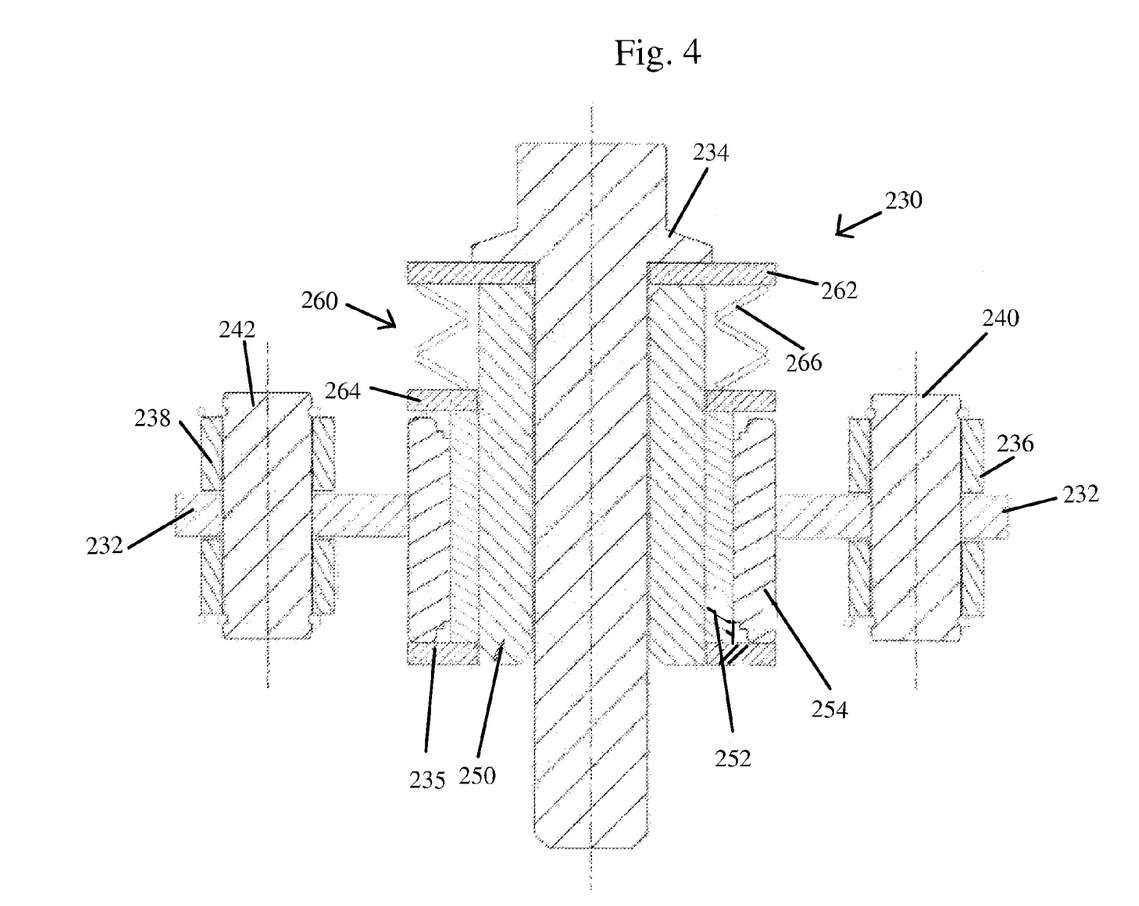
FIG. 4 shows a cross section of the present tensioner through line 4-4 of FIG. 3.

FIG. 4 is a cross section of the one way clutch 230 along line 4-4 of FIG. 3. It shows the one way clutch 230 mounted to the engine (not shown) by a mounting means 234, such as a threaded bolt. A first bushing 250 surrounds the mounting means 234 and is immovably secured to the engine by mounting means 234. A second bushing 252 surrounds the first bushing 250 between mounting plate 235 and a second damping plate 264 and is securely affixed to the inner diameter of one way clutch 230. Increasing chain loads are transmitted through the first linkage 236 and the second linkage 238 to the base plate 232 which is securely affixed to the outer diameter, or clutch sleeve 254, of the one way clutch. When a predetermined amount of torque is experienced by the clutch sleeve 254, the second bushing 252 is allowed to rotationally slip with respect to the first bushing 250. The base plate 232 may rotate about the axis of the mounting means 234 in either direction in response to increasing slack or increasing tension experienced by one or both of the strands of chain 207. As the base plate 232 rotates, the linkages 236 and 238 are either pushed toward or pulled away from the chain 207. Chain load that is transmitted through linkages 236 and 238 creates a torque in the reverse direction that is resisted by the clutch sleeve 254. This maintains an equilibrium in the tension between the two strands of chain 207. However, due to thermal expansion, dynamic stretching of the chain or resonances in the entire system, a tension overload condition may occur. Overload conditions may result in excessive noise, wearing of the chain contact surfaces or even breakage of the chain. The linkages 236 and 238 may then possibly become overextended into the path of the chain during times of high chain loading which might prevent them from returning to a position that would enable them to respond to lower chain loads.

In order to overcome the foregoing potential problem, a frictional damping means 260 permits the base plate 232 to slip rotationally in the direction opposite of the direction of the clutch sleeve 254 when the chain load achieves a predetermined maximum limit. The frictional damping means 260 consists of a spring 266 applying a pre-set amount of force between a first damping plate 262 and a second damping plate 264. The spring 266 is of a design sufficient to exert a force between the first damping plate 262 and the second damping plate 264. Belleville springs are suitable for this application. The second damping plate 264 transmits the force generated by the spring to exert a frictional force between the second bushing 252 and damping plate 264. The coefficient of friction between the second damping plate 264 and the second bushing 252 is defined as the amount of break away torque needed to allow the base plate 232 to rotationally slip in the direction opposite from its normal direction of rotational movement with respect to the clutch sleeve 254. In summary, the one way clutch 230 rotates primarily in one direction to account for changes in chain loads but is able to rotate in the opposite direction in order to correct for possible chain overload conditions.

Figure 5:
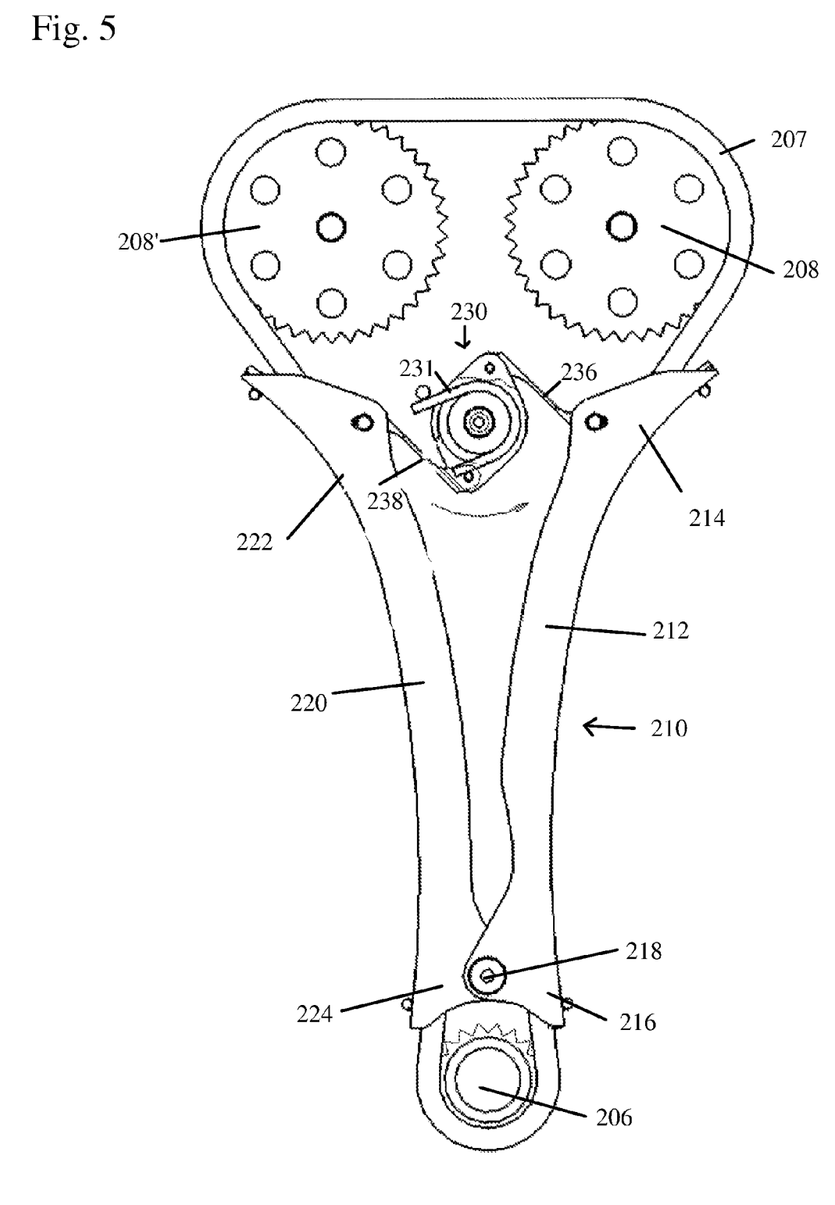
FIG. 5 shows a torsion spring, shown in break out sectional view, as the driving force for the tensioner.
Figure 6:
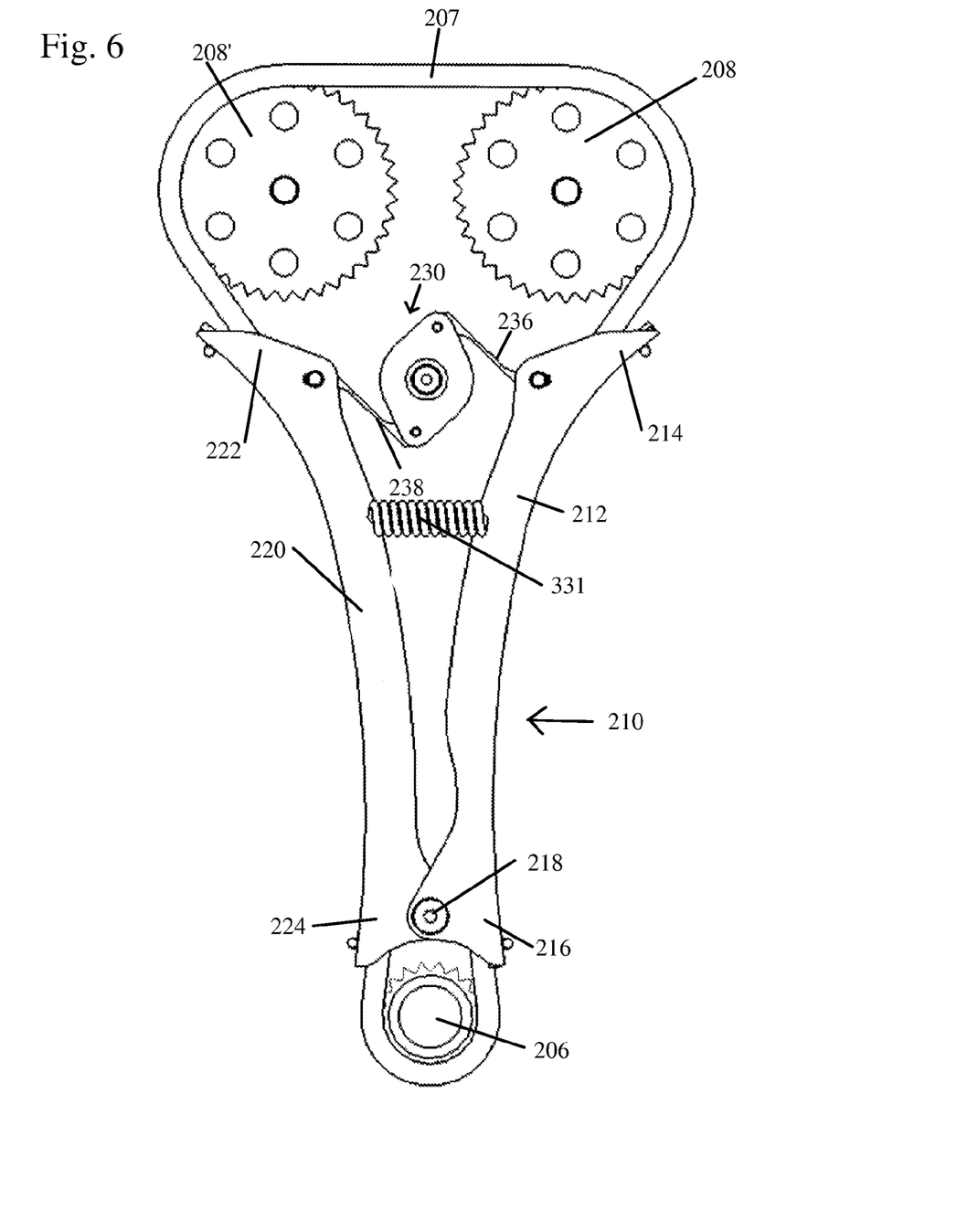
FIG. 6 shows a spring connecting the two tensioning arms as the tensioner driving force.
Figure 7:
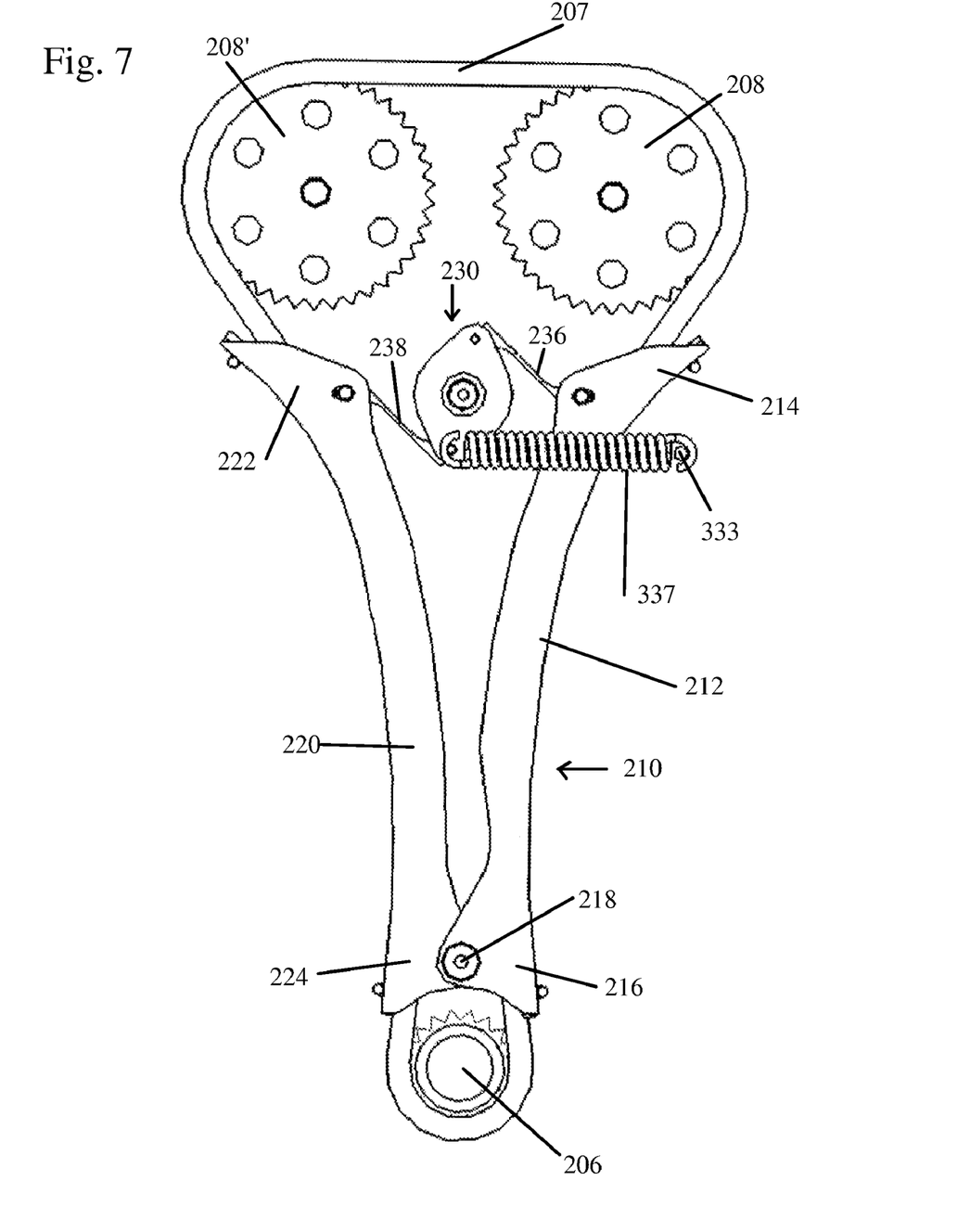
FIG. 7 shows a spring connecting one end of the tensioner with a mounting post on the engine as the tensioner driving force.
Figure 8:
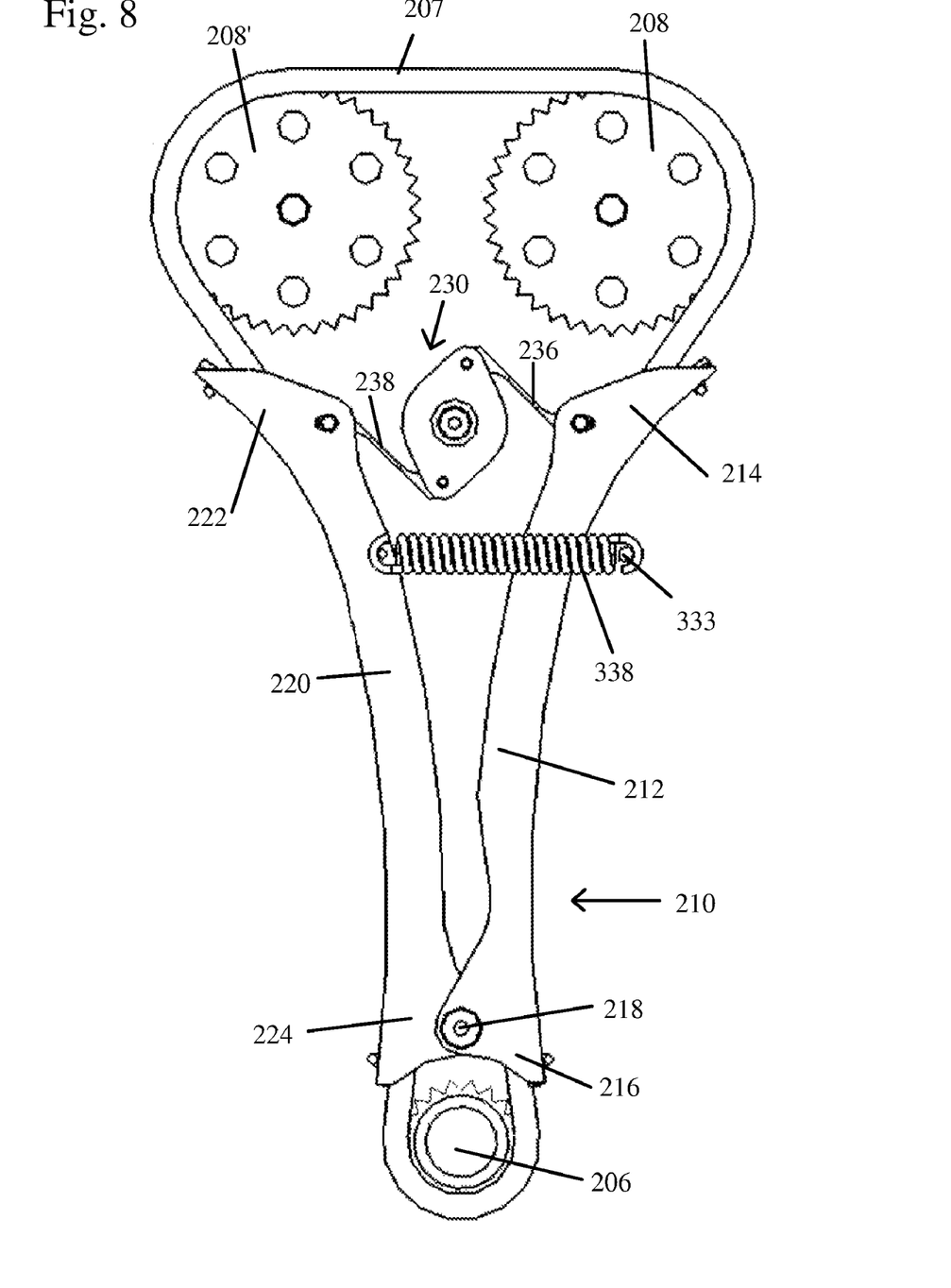
FIG. 8 shows a spring between connecting one of the tensioning arms with a mounting post on the engine located on the other side of the second tensioning arm.

FIGS. 5-8 show alternative embodiments of the present invention. FIG. 5 shows a one way clutch 230 that is rotationally driven by a torsion spring 231. FIG. 6 shows a tension spring 331 attached between the tensioning arms 212 and 220. FIG. 7 shows a tension spring 337 attached between the one-way clutch 230 and an engine mounting 333. FIG. 8 shows a tension spring 338 attached between one of the tensioning arms (in this case, 220) across tensioning arm 212, to engine mounting 333. The underlying feature common to all of the embodiments of the invention is that, in response to changing chain tension, the tensioner 230 applies a uniform force to each tensioning arm via linkages 236 and 238. The same force is applied to all portions of the chain at the same time. Also, should the tensioner 230 detect a tension overload in the chain, the slipping of the frictional damping means 260 uniformly and simultaneously reduces the tension overload throughout the entire chain system. This is a unique feature that overcomes the shortcomings of the prior art systems.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A tensioner for a continuous loop power transmission system of an internal combustion engine, the continuous loop consisting of a chain having a first strand and a second strand, each strand located between a drive sprocket connected to a driveshaft and at least one driven sprocket connected to at least one camshaft, comprising:
   a) a first tensioning arm having a first end, a second end and a chain sliding surface operatively engaging the first strand of chain;
   b) a second tensioning arm having a first end, a second end and a chain sliding surface operatively engaged with the second strand of chain, the second end of the first tensioning arm being mounted to the engine by a pivotal mounting means and the second end of the second tensioning arm being mounted to the engine by a pivotal mounting means;
   c) a one-way clutch including frictional damping means, the one-way clutch pivotally mounted to the engine at a location between the first ends of both tensioning arms, a first linkage connecting the first end of the first tensioning arm to the one-way clutch and a second linkage connecting the first end of the second tensioning arm to the one-way clutch; and
   d) a biasing element coupled to the one-way clutch or at least one of the first tensioning arm or the second tensioning arm to bias the first end of the first tensioning arm and the first end of second tensioning arm towards each other;
   wherein, the one-way clutch is alternatively rotatable in a first direction to adjust tension substantially equally on both strands of chain in response to regular fluctuations in the tension of the chain and a second direction, opposite the first direction, to reduce periodic tension overload conditions experienced by the chain only when a pre-determined resistive force in the frictional damping means is overcome by the force of the tension overload.

2. The tensioner of claim 1, wherein the one-way clutch is selected from a group consisting of a rotational mechanical clutch, a rotational hydraulic clutch, a linear mechanical clutch, a linear hydraulic clutch and a spring/ratchet clutch.

3. The tensioner of claim 2, wherein the one-way clutch is a rotational mechanical clutch.

4. The tensioner of claim 1, wherein the connection between the first linkage and the first end of the first tensioning arm is pivotable and the connection between the second linkage and the first end of the second tensioning arm is pivotable.

5. The tensioner of claim 1, further comprising at least one elongated blade spring on the chain sliding surface of the first tensioning arm.

6. The tensioner of claim 1, further comprising at least one elongated blade spring on the chain sliding surface of the second tensioning arm.

7. The tensioner of claim 1, wherein the pre-determined resistive force in the frictional damping means is provided by a spring applying a pre-set frictional force between a first damping plate and a second damping plate.

8. The tensioner of claim 7, wherein the spring is a belleville spring.

9. The tensioner of claim 8, wherein frictional damping means uniformly and simultaneously eases tension overload throughout the entire power transmission system.

10. The tensioner of claim 1, wherein the biasing element is a torsion spring coupled to the one-way clutch.

11. The tensioner of claim 1, wherein the biasing element is coupled to the first tensioning arm and the second tensioning arm.

12. The tensioner of claim 1, wherein the biasing element is coupled to one of the first tensioning arm or the second tensioning arm and the engine.

13. The tensioner of claim 1, wherein the biasing element is coupled to the one-way clutch and the engine.

* * * * *

UNITED STATES PATENT AND TRADEMARK OFFICE
CERTIFICATE OF CORRECTION

PATENT NO.       : 8,105,195 B2
APPLICATION NO.  : 12/438777
DATED            : January 31, 2012
INVENTOR(S)      : Wigsten It is certified that error appears in the above-identified patent and that said Letters Patent is hereby corrected as shown below:

In the Specification:

Column 5, Line 34: Delete words "base plate 232" and add the words "second bushing 252".

Column 5, Line 48: Delete words "base plate 232" and add the words "second bushing 252".

Signed and Sealed this
Third Day of September, 2013

Teresa Stanek Rea
*Acting Director of the United States Patent and Trademark Office*